United States Patent [19]

Wheeler et al.

[11] 4,194,921
[45] Mar. 25, 1980

[54] PIGMENT COMPOSITIONS AND PROCESS FOR DUST FREE PIGMENT BEADS

[75] Inventors: Ian R. Wheeler, Houston; George H. Robertson, Paisley, both of Scotland

[73] Assignee: Ciba-Geigy Corporation, Ardsley, N.Y.

[21] Appl. No.: 916,169

[22] Filed: Jun. 16, 1978

[30] Foreign Application Priority Data

Jun. 24, 1977 [GB] United Kingdom ............... 26520/77

[51] Int. Cl.$^2$ .......................... C09C 3/08; C09C 3/10
[52] U.S. Cl. ................... 106/309; 106/308 Q; 106/308 C; 106/308 F; 106/308 N; 106/22; 106/23; 260/17 R; 260/24; 260/37 N; 260/29.2 TN
[58] Field of Search ............... 106/309, 308 Q, 308 C, 106/308 F, 308 N, 23, 22; 260/17 R, 37 N

[56] References Cited

U.S. PATENT DOCUMENTS

| | | | |
|---|---|---|---|
| 3,523,030 | 8/1970 | Malin et al. | 106/288 |
| 3,755,244 | 8/1973 | Hart | 260/41 R |
| 3,758,321 | 9/1973 | Santimauro et al. | 106/288 Q |
| 3,775,148 | 11/1973 | Bradley | 106/288 Q |
| 4,015,999 | 4/1977 | Robertson et al. | 106/308 Q |

FOREIGN PATENT DOCUMENTS

| | | | |
|---|---|---|---|
| 277949 | 2/1929 | United Kingdom | 106/309 |
| 517475 | 1/1940 | United Kingdom | 106/309 |
| 908599 | 10/1962 | United Kingdom | 106/309 |
| 971044 | 9/1964 | United Kingdom | 106/309 |
| 1429801 | 3/1976 | United Kingdom . | |
| 1467930 | 3/1977 | United Kingdom . | |

*Primary Examiner*—Carman J. Seccuro
*Attorney, Agent, or Firm*—Joseph F. DiPrima

[57] ABSTRACT

A process for the manufacture of substantially dust free meterable and readily dispersible beads of a pigment composition which comprises contacting with agitation a suspension of a finely divided pigment or pigment composition in a mixture of water and an oxygenated aliphatic hydrocarbon solvent containing from 1 to 5 carbon atoms and having appreciable solubility in water, together with a solution of a carrier which is substantially water insoluble and soluble in the respective solvent at reflux temperature and then distilling off the solvent and recovering the resultant beads by filtration from the aqueous phase.

9 Claims, No Drawings

PIGMENT COMPOSITIONS AND PROCESS FOR DUST FREE PIGMENT BEADS

The present invention relates to the preparation of pigments in solid bead form.

Pigment powders generally have the disadvantage that they suffer from dusting and they are not easily handled or metered. The dusting problem can not only be hazardous to personnel, but can also give rise to pollution. Even non-dusting powders have the disadvantage of poor meterability.

We have devised a method of producing pigment compositions in solid bead form, the beads possessing none of the disadvantages outlined above for the powder form.

Various proposals have been made for the preparation of granulated and beaded pigment compositions. These include the following:

Czechoslovakian Pat. No. 121,598 (Vitezslav Heller et. al.); covers a two-stage process involving mixture of a pigment with carrier in a largely water-immiscible solvent followed by addition to an aqueous solution of a stabiliser. British Pat. No. 1,429,801 (CIBA-GEIGY A.G.); covers milling a largely water immiscible dyestuff with a largely water immiscible solvent diluting the resultant mixture with water and additional solvent to give a two phase system and isolating the resulting composition.

German Offenlegungsschrift No. 2,653,434 (CIBA-GEIGY A.G.); covers a process similar to that of GB No. 1,429,801 involving aqueous rather than solvent milling.

British Pat. No. 1,497,930 (CIBA-GEIGY A.G.); covers mixing a pigment with at least one water insoluble carrier in a two phase system containing at least one largely water immiscible solvent and isolating the resulting composition.

U.S. Pat. No. 3,755,244 (Hercules Inc.); covers a two stage process comprising milling a pigment with a carrier to produce an aqueous slurry and granulating the slurry with a largely water immiscible solvent and other additives followed by isolation of the resulting composition.

All these processes involve the use of completely or substantially water-immiscible solvents.

It has now been found that substantially dust free, meterable and readily dispersible pigment compositions may be conveniently and simply prepared using substantially water miscible solvents.

According to the present invention there is provided a process for the manufacture of substantially dust free meterable and readily dispersible beads of a pigment composition which comprises contacting with agitation a suspension of a finely divided pigment or pigment composition in a mixture of water and an oxygenated aliphatic hydrocarbon solvent containing from 1 to 5 carbon atoms and having appreciable solubility in water, together with a solution of a carrier which is substantially water insoluble and soluble in the respective solvent at reflux temperature and then distilling off the solvent and recovering the resultant beads by filtration from the aqueous phase.

The beads may afterwards be washed free of inorganic salts and subsequently dried.

The beads are easily isolatable and may have a diameter of from 0.2 to 10 millimeters preferably from 1 to 3 millimeters.

Suitable pigments are organic pigments of the type azo, azomethine, anthraquinone, perylene, dioxazine, thioindigo, quinacridone, phthalocyanine, or metal salts.

The oxygenated aliphatic hydrocarbon solvent may be a ketone, alcohol or ester which boils below 100° C., or forms a solvent rich solvent-water azeotrope at temperatures below 100° C. Examples of suitable solvents are methyl ethyl ketone, acetone, isopropanol, n-propanol, n-butanol, isobutyl alcohol, secondary butanol, tertiary butanol, n-pentanol, methanol, ethanol and methyl acetate: isopropanol is preferred.

Prior to distillation sufficient solvent or solvent/water mixture should be used to dissolve the carrier, and to ensure a stirrable mass in the presence of the pigment. The amount of solvent or solvent/water mixture is conveniently from 3 to 15 times the weight of pigment and preferably 4.5 to 8 times the weight of pigment.

As the solvent or solvent/water azeotrope is removed by distillation, there should be sufficient water present or added to ensure that the bead product is finally suspended in water alone. Of the solvents which form azeotropes, those having a high solvent:water ratio in the azeotrope are preferred. Suitable ratios of solvent:water (prior to distillation) are 1:0.05 to 1:3, preferably 1:0.8 to 1:1.8 by weight.

If desired, inorganic salts may be dissolved in the water in the process to assist the formation of beads. Inorganic salts that may conveniently be used are readily soluble chlorides, acetates or sulphates of alkali or alkaline earth metals such as sodium, potassium, lithium, calcium and barium. Sodium chloride is preferred. The amount of inorganic salt may, if desired, be increased up to a saturated aqueous solution of the particular salt at the reaction temperature. However the amount of inorganic salt is conveniently from 80 to 175% by weight based on the weight of pigment.

The carrier should show water insolubility and solubility in the selected solvents at the reflux temperature and is preferably a solid at ambient temperatures. The carrier is selected for the appropriate application on the basis of acceptable solubility and compatibility with the medium.

Suitable carriers are as follows: Fatty alcohols such as cetyl alcohol, stearyl alcohol and cholesterol.

Aryl and alkyl carboxylic acid esters, such as glyceryl tripalmitate, glyceryl tristearate, cetyl palmitate, diethylene glycol dilaurate, glyceryl monostearate, dicyclohexyl phthalate, neopentyl glycol dibenzoate, trimethylol propane tribenzoate, sorbitan monolaurate, sorbitan monostearate and sorbitan tristearate.

Fatty amides such as stearamide, oleamide and palmitamide.

Fatty acids such as the primary, secondary and tertiary amines of the $C_{12}$ and greater chain. Such compounds are commercially available as mixtures of chain lengths. Typical constituents of these are, lauryl amine, oleylamine, stearyl amine, docosanyl amine, dilauryl amine, distearyl amine, didocosanyl amine, dimethyl monostearylamine, dimethyl mono oleyl amine, mono methyl dilaurylamine, monomethyl distearylamine, monomethyl didocosanyl amine, trilauryl amine, tristearyl amine.

Resin acids such as WW Rosin or its hydrogenated or disproportionated derivatives (WW Rosin is refined wood rosin).

Natural or synthetic resins, such as polyamide resins as used in flexographic inks, cellulose acetate propionate, cellulose acetate.

Specially designed resins, such as the Urethanes which have the formula:

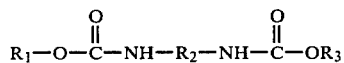

wherein $R_1+R_3$ are derived from monohydroxyl compounds, or the formula:

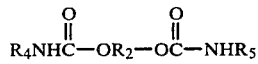

wherein $R_4+R_5$ are derived from monoisocyanate compounds and wherein $R_2$ is an organic bridging residue. Resins of this type are described in GB No. 1445104 are also especially desirable for their resultant application properties.

The amount of carrier that may be used is such that the ratio of pigment or pigment composition to carrier varies from 90:10 to 50:50. While higher proportions of carrier are possible, they are generally less useful for economic reasons. The preferred ratio of pigment or pigment composition to carrier is from 85:15 to 60:40.

Mixtures of the above carriers may also be utilised. Combinations of particular value are the above esters or amides with rosin derivatives or fatty amines. Such combinations are of particular value in giving good dispersibility in ink and paint systems. In these instances optimum bead formation is achieved by control of the pH—below 7 for rosin acid types and above 7 for fatty amine types. When combined with the other carriers the fatty amines are especially useful at promoting a high yield of even sized beads. In this approach amine is used in an amount from 2–10% by weight based on the weight of the pigment with another carrier in an amount from 10–15% by weight based on the weight of the pigment.

The process is of particular advantage for pigments which have been ground by a high energy dry grinding process, with or without the presence of inorganic salt. Such products can then substantially benefit from a solvent treatment described in GB No. 1,140,836, and this pigment dispersion in solvent may then be utilised in the subsequent bead process.

Equally the pigment may be milled in the selected oxygenated solvent or solvent water mixture; such a milling in a sand, gravel, bead or ball mill may be required to deaggregate, deagglomerate or reduce the pigment particle size or improve other application properties such as gloss. This pigment dispersion may then be utilised in the bead formation stage.

Instead of pure pigment, pigments containing selected additives may be utilised. The additive is some compound added during the processing and which gives the pigment improved application properties. This may, in certain instances, be identical with the carriers hereinbefore described. With phthalocyanine pigments, additives of special value are the phthalocyanine pigment derivatives, such as those exemplified in British Patent Specification No. 1,501,184. As noted in these applications, the formation of the pigment compositions also benefits by the incorporation or formation of such additives during the solvent treatment process; the bead making process may therefore again directly follow this treatment process. The derivatives may also be present during the conditioning of the pigment, by the above dry or wet milling.

When the pigment is a phthalocyanine pigment, it may be metal free, or it may be a zinc, copper, nickel or other transition metal phthalocyanine, and may contain up to 50% by weight of chlorine, but preferably it is a copper phthalocyanine which may be in either the alpha or beta crystalline form, or a mixture of the two.

While the exact mechanism of bead formation is not fully understood, we have found that those quantities of the components of a given reaction mixture which give rise to beads, generally exhibit a partitioning of the liquid phase into a solvent rich discontinuous phase, present as droplets containing the dissolved carrier, and a continuous water rich phase.

The treatment of the suspension of pigment with the carrier is conveniently carried out at an elevated temperature for example from 50° C. to 100° C. and preferably from 75° C. to 85° C.

The order of addition of reagents is not critical but the carrier is preferably present before partitioning into two layers. Preferably, the pigment is present as a solvent dispersion from the deaggregation treatment process. The water, carrier and salt may then be added; water with or without added salt, may be added simultaneously during the distillation. If the pigment has been dry ground in the presence of inorganic salts, which are soluble in water, these may be utilised to assist the partitioning and extra salt may not be necessary to promote good bead formation.

The stirring rate can be utilised to control the bead size within the general principles that faster stirring gives smaller beads. The critical factors here are the peripheral speed, vessel to stirrer size ratio and vessel design. Variation of pigment, carrier and solvent and their ratios can also affect size. Stirring rate is therefore a matter of design.

Bead size can also be controlled by selective sieving and recycling through the process, thus the beads at filtration may be passed through a sieve or series of sieves and selected groups returned to the reaction vessel. Alternatively, the dried material may be size classified and unwanted size fractions returned to the reaction vessel. This unwanted size material is preferably added to the solvent before water addition, especially if large amounts of material are being returned. If the material is added to pigment plus solvent, then the carrier in those beads returned can be redissolved and a homogenous mix achieved. A continuous sieving/recycling process is thus advantageous for bead size fractionation and the removal of very small material, which can cause some dustiness and poor meterability.

The beads are non-dusting and by selection of carrier readily dispersible into the application media. At this dispersion stage, the pigment is released from the beads and distributed throughout the media as for conventional powder pigments. The form is also conducive to easy separation from the aqueous phase by sieving. Drying can be by conventional oven but the open structure allows for air circulation and drying by such techniques as fluid bed. The free flowing nature of the beads allows for simple metering either by mechanical or air blowing techniques.

The beads prepared by the process of the present invention may be used in surface-coating applications such as decorative and industrial paints, lacquers and inks, particularly publication gravure inks.

As this process can utilise as a carrier for bead formation a product which can further enhance the application properties, non-dusting can be combined with improvement in such pigment application properties as rheology in solvent systems, colour strength developed and flocculation resistance: the urethanes described in GB Pat. No. 1,445,104 with or without pigment derivatives are an example of this approach where the following advantages can be achieved.

(i) improved millbase flow over the corresponding base pigment (ii) improved strength of the final ink over the corresponding base pigment at equal pigment weight (iii) ability to disperse compositions directly in solvent to produce high pigmentation (30% to 35%) stainers for gravure inks and paints (iv) The carrier may be regarded as part of the binder, thereby saving the user the labour and cost of adding the binder to the formulation.

The present invention therefore also provides a pigment in solid bead form whenever prepared by the process of this invention as well as a surface-coating composition comprising as such a pigment in solid bead form.

In the following Examples which further illustrate the present invention parts and percentages are expressed by weight and carrier is regarded as binder unless otherwise stated.

EXAMPLE 1

64 Parts of crude phthalocyanine, 124 parts of anhydrous calcium chloride, 11 g. of anhydrous sodium acetate, and 1 part of diethylaniline were ground together in a ball mill for approximately 6 hrs. until the mixture contained 60–70% copper phthalocyanine in the α-form (the remainder being in the β-form).

The mixture was added to 600 parts of isopropanol-water azeotrope and stirred for 4 hours. at 80° C. With moderate stirring, 32 parts of a urethane carrier, (prepared by refluxing a 3:2:2 molar mixture of tolylene diisocyanate, ethylene glycol and oleyl alcohol in acetone and removing the solvent by distillation [cf. GB Pat. No. 1,445,104] and subsequently dissolved in 32 parts of isopropanol) were added evenly over 5 minutes. Stirring was maintained for 30 mins. and subsequently as water was added, and the isopropanol-water azeotrope simultaneously removed by distillation over approximately 2 hrs. in such a manner that the volume of the reaction mixture remained essentially constant throughout. Azeotrope removal was considered complete when the distillation temperature reached 86° C. The pigment composition thus produced was isolated from clear liquors by a 60 mesh sieve, washed salt free with water, and dried at 55°–60° C., to yield 94.7 parts of substantially spherical beads of 1 m.m. average diameter. The product of this example was incorporated in a phenolic-toluene publication gravure ink medium by the following procedure To a ball mill were charged

| | |
|---|---|
| phenolic varnish* | 96 parts |
| toluene | 40 parts |
| product of this Example | 24 parts |

-continued

| | |
|---|---|
| 10 mm steatite balls | 400 parts |

*phenolic varnish consisted of equal parts toluene and Alsynol RL 30, a modified phenolic resin, pentaerythritol esterified.

Milling was carried out for 16 hours, then there were added to 100 parts of the mill base, with agitation, 90 parts of phenolic varnish and 60 parts of toluene. An ink of 6% pigmentation level and 1:5 pigment to binder ratio was thus formed. When compared with a similar ink derived from the pigment powder prepared in the absence of added urethane carrier, the ink incorporating the product of the invention was 10% stronger and was derived from a very much more fluid millbase (Table I).

A. Example 2

85 Parts of crude copper phthalocyanine, 165 parts of anhydrous sodium sulphate, 12 parts of anhydrous sodium acetate and 2 parts of diethyl aniline were ground together in a ball mill until the mixture contained approximately 60% of the copper phthalocyanine in the α-form.

187.3 Parts of the mixture were added to 600 parts of isopropanol-water azeotrope and stirred at reflux for 4 hours. 6.7 parts of the phthalocyanine derivative of average formula

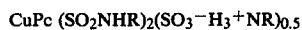
$$CuPc\,(SO_2NHR)_2(SO_3{}^-H_3{}^+NR)_{0.5}$$

where CuPc is copper phthalocyanine and R is a dehydroabietyl residue were added and stirred at reflux for a further 30 minutes. 66 Parts of the 50% solids urethane carrier/isopropanol solution of Example 1 were added over 1 minute and reflux continued with stirring for a further 30 minutes. 600 Parts of water were then added. The isopropanol-water azeotrope was distilled off over approximately 2 hours and the beads thus formed separated from the reaction mixture by filtration, washed salt free with warm water, and dried at 50°–60° C. There were obtained 98.6 parts of substantially spherical beads of 0.9 m.m. average diameter, which, when incorporated in phenolic-toluene gravure ink system by the method of Example 1 gave the excellent strength and flow properties noted in Table I.

The compound of the formula

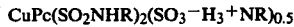
$$CuPc(SO_2NHR)_2(SO_3{}^-H_3{}^+NR)_{0.5}$$

was prepared by treating crude CuPc with chlorosulphonic acid at 110°–113° C. for 5½ hours, and subsequently drowning out into an ice/salt/water mixture. The filtered, washed, presscake was reslurried in more ice/salt/water, the pH adjusted to 5.0 and Rosin Amine D acetate solution added dropwise. After 1 hour at 80°–85° C. sufficient HCl was added to give no blue bleed, and the slurry filtered, washed salt-free and dried at 60° C. (cf. British Patent Specification No. 1,501,184).

B. 45 Parts of beads of A. were added to 55 parts of SBP3 (a hydrocarbon solvent mixture of boiling point 102°–122° C.; Shell-Mex) in a ball mill, and milled for 16 hours. The very fluid, stable dispersion thus obtained had a Zahn Cup No. 3 reading of 8 seconds. A gravure ink of 6% pigmentation and 1:5 pigment: binder ratio, prepared by stirring this dispersion into phenolic-toluene medium had the excellent flow and strength properties noted in Table I.

EXAMPLE 3

91 Parts of crude copper phthalocyanine, 2 parts diethyl aniline and 9 parts of the sulphonated copper phthalocyanine derivative of Example 2 were charged to a 1-liter steel mill containing 2600 parts of steel grinding media. The mill was sealed and agitated for 6 hours on a Tema laboratory vibratory mill. The mill contents were discharged onto a 60 mesh sieve to yield 100 parts of soft textured blue powder.

This powder was transferred into 1000 parts of isopropanol-water azeotrope at 60° C. and the temperature raised to reflux with stirring. 100 Parts of the 50% solids urethane carrier/isopropanol solution of Example 1 were added and the mixture stirred at reflux for 15 mins. While maintaining stirring, water, acidified to pH1 with hydrochloric acid, was added over 1 hour and isopropanol-water azeotrope simultaneously removed by distillation in such a way that the volume of the reaction mixture remained essentially constant. The cooled mixture was filtered, washed free of acid with warm water, and dried at 50° C., yielding 143 parts of beads, 71% of which were between 0.27 mm and 0.42 mm. diameter, and 25% of which were between 0.18 mm and 0.27 mm.

The properties of the product of this example, when incorporated in gravure ink medium by the method of Example 1 are shown in Table 1.

EXAMPLE 4

90 Parts of crude copper phthalocyanine, 2 parts diethyl aniline and 10 parts of the compound of formula:

$$CuPc(SO_3^-HN^+CH_3R_2)_n$$

where CuPc represents copper phthalocyanine, R is a coconut oil residue and n is approximately 2 were ground together by the method of Example 3. The ground mixture was transferred into 500 parts of isopropanol-water azeotrope and the temperature raised to reflux with stirring. While maintaining stirring, 5.75 parts Staybelite resin(Hercules Powder Co.) and 19.25 parts Howflex CP (dicyclohexylphthalate; Laporte Ltd.) were added and refluxed for 15 minutes. 130 Parts sodium chloride and 25 parts concentrated hydrochloric acid in 500 parts water were stirred in and the isopropanol-water azeotrope subsequently removed by distillation, stirring throughout.

After washing and drying there were obtained 123 parts of substantially spherical beads, 91% of which were between 2.5 mm and 3.5 mm. diameter. The performance of the product of this Example when formulated as a gravure ink by the method of Example 1 is shown in Table I. The compound of the formula $$CuPc(SO_3^-HN^+CH_3R_2)_n$$

was prepared as follows

20 Parts of the compound of formula $CuPc(SO_3H)_2$ in which CuPc represents copper phthalocyanine, in presscake form, were stirred in 200 parts of isopropanol and the temperature raised to reflux. 21.2 Parts of the amine of formula

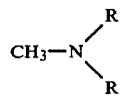

in which R is a coconut oil residue were dissolved in 200 parts not isopropanol, and added over 5 minutes. After a further 30 minutes at reflux, 400 parts water were added over 60 minutes, and the isopropanol simultaneously distilled off at the same rate. Stirring was stopped and the blue-green product of the reaction isolated by filtration from clear liquors, washed with warm water and dried at 60° C. to give a yield of 40.3 parts.

EXAMPLE 5

92 Parts of crude copper phthalocyanine were ground in a ball mill with 8 parts phthalimide until 55% of the copper phthalocyanine was in the α-form. 97.8 parts of this mixture were added to 600 parts of isopropanol-water azeotrope and refluxed with stirring for 5½ hrs. While maintaining stirring, 10 parts of the sulphonated phthalocyanine derivative of Example 4 were added as a slurry in 80 parts hot isopropanol-water azeotrope, reflux continued for 15 mins., and a solution of 5 parts Staybelite resin and 20 parts Howflex in 100 parts hot isopropanol-water azeotrope added with a further 15 min. reflux. Finally, a solution of 135 parts sodium chloride and 30 parts concentrated hydrochloric acid in 600 parts water was added and the isopropanol-water azeotrope subsequently removed by distillation, stirring throughout.

Thus there were obtained 119 parts of slightly flattened beads of 1.3 m.m. average diameter, having excellent flow and strength properties when formulated as a gravure ink by the method of Example 1. (Table 1).

EXAMPLE 6

Example 5 was repeated with the replacement of Howflex by an equal weight of glycerol mono stearate. There were obtained 119 parts of beads of 1.2 m.m. average diameter, with similar application properties to the product of Example 5, as shown in Table 1.

EXAMPLE 7

97.8 Parts of the ground phthalocyanine mixture of Example 5 were added to 600 parts isopropanol-water azeotrope containing 5.15 parts of the compound of formula

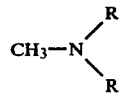

where R is a coconut oil residue, commercially available as Kemamine T.6501 (Humko Chemical Products). The mixture was held at reflux, with stirring, for 4 hrs. and subsequently stirred at reflux during the additions of 4.85 parts copper phthalocyanine disulphonic acid dispersed in 50 parts isopropanol-water azeotrope; 15 mins. later, 25 parts Howflex in 100 parts of the hot azeotrope, and a further 15 mins. later, a solution of 145 parts Sodium Chloride and 5 parts concentrated hydrochloric acid in 1000 parts water. The isopropanol-water azeotrope was removed by distillation, stirring throughout, to yield, after washing and drying as previously described, 118 parts of slightly flattened beads of 2.1 m.m. average diameter.

The properties of the ink derived from this product by the method of Example 1 are shown in Table 1.

EXAMPLE 8

175 Parts of crude copper phthalocyanine were ground with 23 parts of inorganic salts, 1.6 parts diethyl aniline and 0.8 parts glycerol mono-oleate until the phthalocyanine was in pigmentary form. 103 parts of this mixture, corresponding to 90 parts of copper phthalocyanine, were added to 600 parts of isopropanol-water azeotrope and stirred at reflux for 5 hrs. 10 Parts of the sulphonated phthalocyanine derivative used in Example 4 were added as a dispersion in 75 parts of isopropanol-water azeotrope. Stirring was maintained at reflux for 15 mins., and subsequently during the addition of 25 parts Cithrol CSP (Croda Chemicals Ltd.) in 100 parts hot isopropanol-water azeotrope, and 15 mins. later, 50 parts sodium chloride dissolved in 700 parts water. The isopropanol-water azeotrope was removed by distillation and the product filtered, washed and dried as previously described. There were thus obtained 123 parts of a non dusting powder having the application properties shown in Table 1.

EXAMPLE 9

90 Parts of crude copper phthalocyanine, 2 parts diethyl aniline and 10 parts of the compound of formula $$CuPc(SO_3^-Hn^+CH_3R_2)_n$$

where CuPc is copper phthalocyanine, R is a hydrogenated tallow residue and n is approximately 2, were ground together in a ball mill for 4 hrs. The milled mixture was transferred into 500 parts of isopropanol-water azeotrope and the temperature raised to reflux with stirring. 25 Parts of the urethane compound of Example 1, prepared from its precursors in 10 parts isopropyl acetate solvent, and subsequently diluted to a 50% solids solution with further isopropyl acetate, were added and stirring at reflux maintained for 10 mins., and subsequently during the additions of 38 parts concentrated hydrochloric acid in 38 parts water, and 10 mins. later, 625 parts cold water saturated with sodium chloride. The product recovered by removal of the isopropanol and substantially hydrolysed isopropyl acetate by distillation, followed by washing and drying as previously described was in the form of spherical beads in a yield of 121 parts, 82% of which were within the range 2.5 m.m.–3.5 m.m. diameter.

The properties of the ink derived from this product by the method of Example 1 are shown in Table 1.

The compound of the formula $$CuPc(SO_3^-HN^+CH_3R_2)_n$$

was prepared as follows

20 Parts of the compound of formula -CuPc-$(SO_3H)_x^-$ in which x is 2, in presscake form, were stirred in 200 parts of isopropanol and the temperature raised to reflux. 29.2 parts of the amine of formula $$R_2-N-R_3$$
$$|$$
$$R_4$$

where $R_4$ is a methyl group and $R_2$, $R_3$ are hydrogenated tallow residues, were dissolved in 200 parts hot isopropanol and added over 5 minutes. After a further 30 minutes at reflux, 400 parts of water were added over 60 minutes, and the isopropanol simultaneously distilled off at the same rate. Stirring was stopped and the blue-green product of the reaction isolated by filtration from clear liquors, washed with warm water, and dried at 60° C. to give a yield of 48.1 parts.

EXAMPLE 10

The ground mixture of Example 9 was added to 500 parts ethanol and raised to reflux with stirring. 38 Parts of concentrated hydrochloric acid in 600 parts water were added and stirring at reflux maintained for 10 mins., and subsequently during the addition over 30 mins. of 42.8 parts of the urethane compound of Example 1, prepared from its precursors in 18 parts ethyl acetate and subsequently diluted to a 50% solids solution with 24.8 parts ethanol, prior to addition. After stirring at reflux for a further 15 mins., the ethanol and substantially hydrolysed ethyl acetate were removed by distillation, to yield, after filtration, washing and drying, 139.6 parts of a non dusting powder, with application properties shown in Table 1.

EXAMPLE 11

72 Parts of an α-form copper phthalocyanine pigment stabilised by 1.8% w/w peripherally bound chlorine were stirred in 500 parts isopropanol-water azeotrope and the temperature raised to reflux. 8 parts of the sulphonated phthalocyanine derivative of Example 4 were stirred in, followed 10 mins. later by 40 parts of the 50% urethane solution in isopropanol used in Example 1. Stirring was maintained at reflux for a further 10 mins. and subsequently during the addition of a solution of 150 parts sodium chloride in 500 parts water and the removal of the isopropanol-water azeotrope by distillation.

There were obtained 97.2 parts of beads of 1.7 m.m. average diameter. This product was incorporated in a glycerol conconut oil alkyd resin solution in xylene/butanol solvents by ballmilling, and subsequently reduced to 5.9% pigmentation at 1:6.6 pigment:binder by the addition of an unmodified isobutylated melamine-formaldehyde resin solution. The resulting dispersion was considerably more fluid than a similar dispersion prepared from the α-form copper phthalocyanine starting material.

Paints prepared from these dispersions by mixing with white alkyd melamine-formaldehyde paint and stoving, showed the product of this example to have a 10–15% strength advantage.

EXAMPLE 12

Example 11 was repeated with the replacement of the α-form copper phthalocyanine by an equal weight of a copper phthalocyanine green containing 48% peripherally bound chlorine. The bead product demonstrated similar flow and strength advantages over the phthalocyanine green starting material.

TABLE 1

| | Bead Composition | | | Phenolic Toluene Publication Gravure Ink | | | |
|---|---|---|---|---|---|---|---|
| | | | | Millbase | | Final Ink (6% Pigmentation) | |
| | | | | Fineness of Grind | Flow | Flow | |
| Example No. | Pigment % | Additive % | Carrier % | (Hegman Gauge) | (Zahn Cup No. 3) | (Zahn Cup No. 2) | Colouristic Results |
| — | 100 | — | — | 8:7:7 | Too thixotropic, No reading. | 28 secs. | CONTROL |
| 1 | 66.7 | — | 33.3 | 8:7½:7 | 13 secs. | 21 secs. | 5–10% strong, slightly red |
| 2A | 60.3 | 6.7 | 33 | 8:7½:7 | 9 secs. | 19 secs. | 15% strong, slightly clean |
| 2B | 60.3 | 6.7 | 33 | 8:7½:7 | 8 secs. | 24 secs. | 15% strong, clean, slightly red, superior gloss |
| 3 | 60.6 | 6.0 | 33.3 | 8:7:7 | 12 secs. | 21 secs. | 5–10% strong, slightly red |
| 4 | 72 | 8 | 20 | 8:8:7 | 55 secs. | 23 secs. | 10% strong, very slightly clean and green |
| 5 | 72 | 8 | 20 | 8:8:7 | 20 secs. | 18 secs. | 15% strong, very slightly clean and green; superior gloss and transparency |
| 6 | 72 | 8 | 20 | 8:8:7 | 20 secs. | 23 secs. | 0–5% strong, slightly clean and green |
| 7 | 72 | 8 | 20 | 8:8:7 | 62 secs. | 23 secs. | 10% strong, slightly red |
| 8 | 72 | 8 | 20 | 8:7:7 | 21 secs. | 19 secs. | 10–15% strong, slightly superior gloss and transparency |
| 9 | 72 | 8 | 20 | 8:7:6 | 11 secs. | 17 secs. | Equal strength |
| 10 | 63 | 7 | 30 | 8:7½:7 | 15 secs. | 20 secs. | 5% strong, very slightly clean |

EXAMPLE 13

95.1 Parts of the ground copper phthalocyanine mixture of Example 5, corresponding to 87.5 parts of copper phthalocyanine were added to 600 parts of acetone and refluxed with stirring for 5 hours. While maintaining stirring, 12.5 parts of the sulphonated phthalocyanine derivative of Example 9 were added as a slurry in 80 parts hot acetone, reflux continued for 15 minutes, and a mixture of 22.5 g Howflex CP and 2.5 g monomethyl di(hydrogenated tallow) amine (Kemamine T9701, Humbro Chemical Products) added with a further 15 minutes reflux. Finally, a solution of 130 parts sodium chloride and 30 parts concentrated hydrochloric acid in 600 parts water was added and the acetone subsequently removed by distillation, stirring throughout.

The beads so formed were poured onto a 60 mesh sieve, washed salt and acid free with warm water and dried at 50°–55° C. The yield of beads retained by the sieve was 123 parts.

EXAMPLE 14

Example 5 was repeated with the omission of the sulphonated phthalocyanine additive and the use of 22.5 parts of technical oleamide (Crodamide O; Croda Chemicals Ltd) as carrier. There were obtained 109.1 parts of spherical beads of 1.5–3 mm average diameter. When incorporated in a lithographic varnish on a Muller with carrier regarded as binder, the product of this Example was stronger and glossier than a similar ink at the same pigmentation level, based on the solvent treated ground copper phthalocyanine pigment of this Example, untreated by carrier.

EXAMPLE 15

The method of Example 14 was repeated with the use of methyl ethyl ketone as solvent and a mixture of 18 parts of Howflex CP and 4.5 parts technical stearylamine (Crodamine 1.18 D; Croda Chemicals Ltd) 106 parts of irregularly shaped 4–9 mm diameter beads were retained on a 60 mesh sieve.

EXAMPLE 16

97.8 Parts of the ground phthalocyanine mixture of Example 5 were added to 600 parts of isopropanol-water azeotrope and refluxed with stirring for 5 hours. 10 parts of the compound of formula:

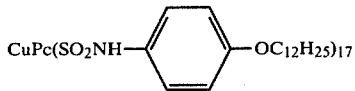

were added and reflux continued for 15 minutes. Then there were added 20 parts Howflex CP and 5 parts technical stearylamine (Crodamine 1-18 D) followed, 15 minutes later, by 1000 parts water at 55° C., containing 145 parts sodium chloride and 10 parts sodium carbonate. Isopropanol-water azeotrope was removed by distillation until the temperature reached 86° C. The reaction mixture was diluted with 400 parts cold water and filtered on a 60 mesh sieve. There were obtained 118 parts of spherical beads of 2–4 mm diameter, having similar strength and flow in toluene based publication gravure inks, to the product of Example 1.

EXAMPLE 17

The method of Example 16 was repeated until the carrier mixture had been added. After 15 minutes reflux, 1000 parts water containing 145 parts sodium chloride were added and isopropanol-water azeotrope removed by distillation until the temperature reached 86° C. A further 500 parts cold water, followed by 60 parts of 1:1 concentrated hydrochloric acid:water were run in and stirred for 10 minutes. The reaction mixture was poured onto a 60 mesh sieve, washed and dried to yield 119 parts of spherical beads of 2.3 mm diameter.

The product of this example was dispersed in toluene by high speed cavitation mixing to give a Hegman Gauge, reading of 8:7:7 within 30 minutes. This dispersion was capable of reduction into phenolic-toluene binder solution to produce an ink of similar properties to that of the previous Example.

EXAMPLE 18

50 Parts of C.I. Pigment Yellow 93, in the form of 25% w/w aqueous presscake, were added to 250 parts of isopropanol. With stirring, the mixture was refluxed for 2 hours, then there was added a solution of 0.5 parts of hydroxy ethyl cellulose (Natrosol 250HR, Hercules Inc.) and 7.9 parts Howflex CP in 50 parts of hot isopropanol. Reflux was continued for 15 minutes, and a solution of 73 parts of sodium chloride in 300 parts of water run in. Isopropanol was removed by distillation. Stirring was stopped and the product recovered on a 60 # sieve, washed with warm water and dried at 40° C. There were obtained 55 parts of beads having an average diameter of 5.5 mm.

EXAMPLE 19

The method of Example 18 was repeated using 50 parts of C.I. Pigment Green 7 in aqueous presscake form. There were obtained 54 parts of beads having an average diameter of 6 mm.

EXAMPLE 20

15 Parts of C.I. Pigment Violet 37, in powder form, were added to 120 parts of isopropanol-water azeotrope and heated to reflux with stirring. 7.5 Parts of Howflex CP were added and stirred for 5 minutes, followed by a solution of 20 parts of sodium chloride in 200 parts water. While maintaining stirring, isopropanol-water azeotrope was removed by distillation to a vapour temperature of 86° C. 22 parts of beads of average diameter 7.5 mm were obtained by filtration, washing with warm water and drying at 50° C.

What we claim is:

1. A process for the manufacture of substantially dust free meterable and readily dispersible beads of a pigment composition which comprises contacting with agitation a suspension of a finely divided pigment or pigment composition in a mixture of water and an oxygenated aliphatic hydrocarbon solvent containing from 1 to 5 carbon atoms and having appreciable solubility in water, together with a solution of a carrier which is substantially water insoluble and soluble in the respective solvent at reflux temperature and then distilling off the solvent and recovering the resultant beads by filtration from the aqueous phase.

2. A process as claimed in claim 1, wherein the pigment employed is of the type azo, azomethine, anthraquinone, perylene, dioxazine, thioindigo, quinacridone, phthalocyanine or metal salts.

3. A process as claimed in claim 1 or claim 2 wherein the solvent employed is a ketone, alcohol or ester which boils below 100° C. or forms a solvent rich solvent-water azeotrope at temperatures below 100° C.

4. A process as claimed in any one of claims 1 to 3 wherein the amount of solvent or solvent/water mixture is from 3 to 15 times the weight of pigment.

5. A process as claimed in any one of claims 1 to 4 wherein the carrier employed is a fatty alcohol, an aryl or alkyl carboxylic acid ester, a fatty amide, a primary, secondary or tertiary amine or C12 and greater chain length, a rosin acid or a natural or synthetic resin, or a mixture thereof.

6. A process as claimed in any one of claims 1 to 5 wherein the carrier is an ester, a fatty amide or a urethane of the formula

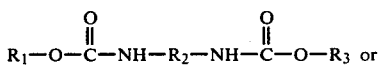

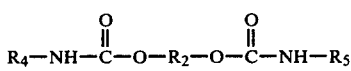

wherein $R_1$ and $R_2$ are derived from monohydroxyl compounds, $R_4$ and $R_5$ are derived from monoisocyanate and wherein $R_2$ is an organic bridging radical.

7. A process as claimed in any one of claims 1 to 6 wherein the carrier is a urethane of the formulae illustrated in claim 9 and $R_1, R_3, R_4$ and $R_5$ are the same or different and represent an alkyl or cycloalkyl radical having from 1 to 22 carbon atoms, an alkenyl residue having from 4 to 22 carbon atoms, an aralkyl radical having from 7 to 40 carbon atoms or an optionally substituted aryl radical having from 6 to 20 carbon atoms, and $R_2$ is an alkylene radical having from 1 to 20 carbon atoms, an arylene radical having from 6 to 40 carbon atoms or an aralkylene residue having from 7 to 40 carbon atoms.

8. A process as claimed in any one of claims 1 to 7 wherein the ratio of pigment or pigment composition to carrier is between 90:10 and 50:50.

9. A process as claimed in any one of claims 1 to 8 wherein the beads obtained have a particle size of between 0.2 and 10 millimeters.

* * * * *